US012217614B1

United States Patent
Lv et al.

(10) Patent No.: US 12,217,614 B1
(45) Date of Patent: Feb. 4, 2025

(54) METHOD AND SYSTEM FOR RESOLVING MULTI-OPERATOR DISTRIBUTED COOPERATIVE CONFLICT OF UNMANNED AIR VEHICLE

(71) Applicant: CIVIL AVIATION MANAGEMENT INSTITUTE OF CHINA, Beijing (CN)

(72) Inventors: Renli Lv, Beijing (CN); Meiliwen Wu, Beijing (CN)

(73) Assignee: CIVIL AVIATION MANAGEMENT INSTITUTE OF CHINA, Beijing (CN)

( * ) Notice: Subject to any disclaimer, the term of this patent is extended or adjusted under 35 U.S.C. 154(b) by 0 days.

(21) Appl. No.: 18/824,786

(22) Filed: Sep. 4, 2024

(30) Foreign Application Priority Data

Nov. 28, 2023 (CN) .......................... 202311601829.2

(51) Int. Cl.
G08G 5/00 (2006.01)
G08G 5/04 (2006.01)

(52) U.S. Cl.
CPC ............... *G08G 5/003* (2013.01); *G08G 5/04* (2013.01)

(58) Field of Classification Search
CPC .................................. G08G 5/003; G08G 5/04
See application file for complete search history.

(56) References Cited

U.S. PATENT DOCUMENTS 5,487,172 A * 1/1996 Hyatt ....................... G06F 13/16
700/8
9,609,288 B1 * 3/2017 Richman .............. G06V 20/176
(Continued)

FOREIGN PATENT DOCUMENTS

CN 110243359 A 9/2019
CN 111898900 A * 11/2020 ....... G06Q 10/06315
(Continued)

OTHER PUBLICATIONS

"Conflict Probability Based Strategic Conflict Resolution for UAS Traffic Management;" Tang et al., 2023 IEEE/AIAA 42nd Digital Avionics Systems Conference (DASC) (2023, pp. 1-10); Oct. 1, 2023. (Year: 2023).*
(Continued)

*Primary Examiner* — Khoi H Tran
*Assistant Examiner* — Jorge O Peche
(74) *Attorney, Agent, or Firm* — Daniel M. Cohn; Howard M. Cohn (57) ABSTRACT

A method and system for resolving a multi-operator distributed collaborative conflict of an unmanned air vehicle is disclosed, including: resolving a conflict in a strategic stage: generating multidimensional data based on time and spatial elements, rasterizing the multidimensional data, performing preliminary conflict resolution according to a preset airspace and an airspace requirement after rasterizing, and generating strategy approval information; and completing strategy conflict resolution by checking the strategy information; resolving a conflict in a pre-tactical stage: acquiring flight plan approval information, designating checking parties, performing multiple checks on the flight plan information, and performing judgment in combination with checking results of a plurality of checking parties to generate a conflict checking result; and resolving a conflict in a tactical stage: identifying a trajectory deviation according to real-time flight data, and sending out a warning according to a deviation category; and optimizing a path according to the deviated trajectory.

9 Claims, 2 Drawing Sheets

(56) References Cited

U.S. PATENT DOCUMENTS

| | | | |
|---|---|---|---|
| 9,613,538 B1* | 4/2017 | Poole | G06F 3/04815 |
| 9,618,940 B1* | 4/2017 | Michini | G08G 5/0069 |
| 9,881,213 B2* | 1/2018 | Michini | G05D 1/0016 |
| 9,915,946 B2* | 3/2018 | Poole | G06F 3/04815 |
| 10,061,470 B2* | 8/2018 | Richman | G06Q 10/063114 |
| 10,083,616 B2* | 9/2018 | Bauer | G05D 1/0038 |
| 10,303,186 B2* | 5/2019 | Wang | G08G 5/025 |
| 10,332,409 B2* | 6/2019 | Gavrilets | G08G 5/045 |
| 10,700,935 B1* | 6/2020 | Mousavi | G06N 20/00 |
| 11,530,921 B2* | 12/2022 | Nimmagadda | G01C 21/20 |
| 11,934,968 B1* | 3/2024 | Stillerman | G06N 20/00 |
| 2005/0109872 A1* | 5/2005 | Voos | G08G 5/0013 244/3.17 |
| 2010/0042275 A1* | 2/2010 | Kirk | G01W 1/04 701/14 |
| 2010/0114411 A1* | 5/2010 | Schmidt | B64C 25/001 340/960 |
| 2013/0261949 A1* | 10/2013 | Eriksson | G08G 1/161 701/300 |
| 2014/0253722 A1* | 9/2014 | Smyth | G06T 7/10 348/135 |
| 2015/0088342 A1* | 3/2015 | Conner | G01W 1/08 701/14 |
| 2015/0262018 A1* | 9/2015 | Buchanan | G06V 10/255 382/104 |
| 2016/0133137 A1* | 5/2016 | Rencher | G08G 5/0021 701/537 |
| 2016/0140851 A1 | 5/2016 | Levy et al. | |
| 2016/0364989 A1* | 12/2016 | Speasl | G08G 5/0069 |
| 2017/0192424 A1* | 7/2017 | Poole | G06Q 10/1097 |
| 2017/0193297 A1* | 7/2017 | Michini | G06F 3/04815 |
| 2017/0193829 A1* | 7/2017 | Bauer | G08G 5/0013 |
| 2017/0242431 A1* | 8/2017 | Dowlatkhah | H04B 7/18504 |
| 2017/0345318 A1* | 11/2017 | Kim | G08G 5/0013 |
| 2017/0357273 A1* | 12/2017 | Michini | G05D 1/106 |
| 2017/0358224 A1* | 12/2017 | Priest | G08G 5/0039 |
| 2018/0233054 A1* | 8/2018 | Woon | G08G 5/0056 |
| 2019/0014461 A1* | 1/2019 | Winkle | G08B 21/02 |
| 2019/0023392 A1* | 1/2019 | Micros | B64U 80/82 |
| 2019/0031330 A1* | 1/2019 | Groden | G08G 5/0091 |
| 2019/0035140 A1* | 1/2019 | Fricke | G06T 15/506 |
| 2019/0156681 A1* | 5/2019 | Whiting | G08G 5/0013 |
| 2019/0304314 A1* | 10/2019 | Hochwarth | G08G 5/0091 |
| 2021/0022046 A1* | 1/2021 | Wang | G08G 5/0052 |
| 2021/0043098 A1* | 2/2021 | Wang | G05D 1/101 |
| 2021/0065563 A1* | 3/2021 | Bauer | G06V 20/17 |
| 2021/0082208 A1* | 3/2021 | Surace | G08G 5/0091 |
| 2021/0134163 A1* | 5/2021 | Wissler | G08G 5/0069 |
| 2021/0383708 A1* | 12/2021 | Gibbons, II | G08G 5/003 |
| 2022/0051467 A1* | 2/2022 | Woop | G06T 1/20 |
| 2022/0135075 A1* | 5/2022 | Ng | G06F 9/505 701/301 |
| 2022/0150800 A1* | 5/2022 | Harada | H04L 5/0048 |
| 2022/0166576 A1* | 5/2022 | Harada | H04L 5/0048 |
| 2022/0263618 A1* | 8/2022 | Harada | H04J 11/0076 |
| 2022/0284657 A1* | 9/2022 | Müller | G06N 3/084 |
| 2022/0284658 A1* | 9/2022 | Müller | G06N 3/084 |
| 2023/0052645 A1* | 2/2023 | Keller | G06N 3/08 |
| 2023/0097571 A1* | 3/2023 | McCain | A63F 13/577 463/32 |
| 2023/0166867 A1* | 6/2023 | Dow | B64F 1/362 320/108 |
| 2023/0281955 A1* | 9/2023 | Ackerson | G06V 10/762 382/274 |
| 2023/0303315 A1* | 9/2023 | Chung | B65D 88/022 |
| 2023/0386347 A1* | 11/2023 | Parker | G08G 5/045 |

FOREIGN PATENT DOCUMENTS

| | | | | |
|---|---|---|---|---|
| CN | 112368660 A | * | 2/2021 | B60L 58/10 |
| CN | 115938162 A | | 4/2023 | |
| CN | 116386391 A | * | 7/2023 | |
| CN | 116564140 A | * | 8/2023 | |
| CN | 117649785 A | * | 3/2024 | |
| DE | 102022118651 A1 | * | 2/2023 | G06N 3/02 |
| EP | 4186739 A1 | * | 5/2023 | B60L 53/12 |
| EP | 4300466 A1 | * | 1/2024 | G08G 5/0034 |
| GB | 2569789 A | | 7/2019 | |
| GB | 2598971 A | * | 3/2022 | G08G 5/0013 |
| KR | 20170002191 A | * | 1/2017 | |
| WO | WO-2015155226 A1 | * | 10/2015 | G08G 5/0013 |
| WO | WO-2018105576 A1 | * | 6/2018 | B64C 39/024 |
| WO | WO-2019122842 A1 | * | 6/2019 | B64C 39/024 |
| WO | WO-2020014951 A1 | * | 1/2020 | |
| WO | WO-2021046015 A1 | * | 3/2021 | G08G 5/0013 |

OTHER PUBLICATIONS

"Conflict-Aware Flight Planning for Avoiding Near Mid-Air Collisions;" Paul et al., 2019 IEEE/AIAA 38th Digital Avionics Systems Conference (DASC) (2019, pp. 1-10); Sep. 1, 2019. (Year: 2019).*
"Feasibility of using synthetic vision technology for UAV operator support;" Tadema et al., Digital Avionics Systems Conference, 2003. DASC '03. The 22nd (vol. 2, 2003, pp. 8.B.1-81-13 vol.2); Jan. 1, 2003. (Year: 2003).*
"Systematic Review of Collision-Avoidance Approaches for Unmanned Aerial Vehicles;" Tang et al.; IEEE Systems Journal (vol. 16, Issue: 3, 2022, pp. 4356-4367); Aug. 31, 2021. (Year: 2021).*
"Towards the Unmanned Aerial Vehicle Traffic Management Systems (UTMs): Security Risks and Challenges;" Spalas; Arxiv ID: 2408.11125; Aug. 20, 2024. (Year: 2024).*
"Elevating the future of mobility: UAV-enabled Intelligent Transportation Systems;" Saboor et al., Arxiv ID: 2110.09934, Oct. 19, 2021 (Year: 2021).*
Notification to Grant Patent Right for Invention, Chinese Application No. 202311601829.2, mailed May 17, 2024 (3 pages).

* cited by examiner

METHOD AND SYSTEM FOR RESOLVING MULTI-OPERATOR DISTRIBUTED COOPERATIVE CONFLICT OF UNMANNED AIR VEHICLE

TECHNICAL FIELD

The present invention relates to the technical field of air traffic management, in particular to a method and system for resolving a multi-operator distributed collaborative conflict of an unmanned air vehicle.

BACKGROUND

Currently, unmanned aviation is continuously and rapidly developing and iteratively evolving, and has become a new social life and economic production mode, which represents a development trend of the global aviation industry. Due to diversity in enterprises, operation scenarios, and styles of unmanned air vehicles, a conflict of operation of multiple unmanned air vehicles is computationally intensive, which leads to a risk of a crash.

In addition, in a scenario of the operation of multiple unmanned air vehicles, data transmission between multiple platforms is involved. There is a certain time interval in transmissions between different platforms, and it is impossible to ensure uniformity of global data in check of a flight plan at the same time, which leads to loss of rigor of a checking result, thereby generating a collision risk.

Therefore, it is a problem urgently to be solved in the art that how to solve the problem of generating flight plans and a flight path conflict among multiple unmanned air vehicles with multiple operators in a flight task and lower a risk of a flight collision.

SUMMARY

In view of the above, the present invention provides a method and system for resolving a multi-operator distributed collaborative conflict of an unmanned air vehicle, which reduces collision accidents under multi-unmanned-air-vehicle operation while improving data security.

In order to achieve the above purpose, the following technical solution is adopted in the present invention.

A method for resolving a multi-operator distributed collaborative conflict of an unmanned air vehicle includes:
  resolving a conflict in a strategic stage: generating multidimensional data based on time and spatial elements, rasterizing the multidimensional data, performing preliminary conflict resolution according to a preset airspace and an airspace requirement after rasterizing, and generating strategy approval information; and completing strategy conflict resolution by checking the strategy information;
  resolving a conflict in a pre-tactical stage: acquiring flight plan approval information, designating checking parties, performing multiple checks on the flight plan information, and performing judgment in combination with checking results of a plurality of checking parties to generate a conflict checking result;
  resolving a conflict in a tactical stage: identifying a trajectory deviation according to real-time flight data, and sending out a warning according to a deviation category; and optimizing a path according to the deviated trajectory, so as to complete tactical conflict resolution.

Further, the multidimensional data includes a time, a longitude, a latitude, and an altitude. Preliminary conflict resolution includes: setting a rasterization element; rasterizing a time range and a space range according to the rasterization element; comparing grids one by one to obtain a conflict situation between the airspace requirement and the preset airspace; and adjusting the airspace requirement according to the conflict situation to generate strategy approval information.

Further, the checking parties include a main checking party and a plurality of secondary checking parties, wherein the main checking party is an initiator platform of the flight plan approval information, and each secondary checking party is a node platform preset in a distributed architecture.

Further, the step of performing multiple checks and performing judgment in combination with checking results of a plurality of checking parties includes: with waypoints in a unit time in the flight plan information as checking units, computing checking factors y of the checking units:

$$[y,c]=z(a_1,a_2)$$

$$z(a_1, a_2) = \begin{cases} \text{if } DIST(a_1, a_2) < l_c, y = 1, c = a_1 \\ \text{if } DIST(a_1, a_2) \neq 0, y = 0, c = \text{null} \end{cases}$$

$$a_1=[x_1,y_1,z_1]$$

$$a_2=[x_2,y_2,z_2]$$

wherein z is a checking function; DIST is a distance function; $a_1$ and $a_2$ are position vectors; in the position vectors, $x_1$ and $x_2$ represent forward position elements, $y_1$ and $y_2$ represent transverse position elements, and $z_1$ and $z_2$ represent vertical position elements; y is the checking factor, used for judging a level of a conflict; C is a conflict mark bit containing a time stamp of a current day; and $l_c$ is a specific position of a conflict in a flight plan to be checked; and obtaining a conflict checking result Y according to the checking factors y of the checking units:

$$y = \sum_0^{t_c=86400/dt_c} \sum_1^{q=N_q} \sum_1^{k=N_k} \sum_1^{m=N_m}$$

$$\left(z_y(x'_{p\_t_c}, x_{p\_mkq\_t_c}) + z_y(x'_{p\_t_c} + [[-dl_1, dl_2], \pm\frac{w_l}{2}, \pm\frac{w_h}{2}],\right.$$

$$x_{p\_mkq\_t_c} + [[-dl_1, dl_2], \pm\frac{w_l}{2}, \pm\frac{w_h}{2}]) + z_y$$

$$\left(x'_{p\_t_c} + [[-dl_1, dl_2], \pm\frac{w_l}{2}, \pm\frac{w_h}{2}], x_{p\_mkq\ t_c} + [[-dl_1, dl_2], \pm\frac{w_l}{2}, \pm\frac{w_h}{2}]\right)$$

wherein $z_y$ represents an y-value output of the function z; $dt_c$ represents the unit time of each checking unit; $N_m$ represents a number of service SSPs, $N_k$ represents a number of sorties in flight plans submitted for different aircrafts by different services SSPs, and $N_q$ represents a number of the flight plans submitted for different aircrafts by different services SSPs; $t_1$ and $t_2$ are time interval nodes for arriving the waypoints; $dl_1$ and $dl_2$ are distance interval nodes for arriving the waypoints, $w_l$ is a transverse safety dimension, $w_h$ is a vertical safety dimension, and subscript_$t_c$ of $x_{p\_t_c}'$ represents that different $t_c$ correspond to estimated positions of unmanned air vehicles in the flight plans with integration of $t_c$; and $x_{p\_mkq\_t_c}$ represents corresponding approved flight plan data of the estimated positions.

Further, for the main checking party, each estimated position is obtained in the following way:
acquiring a flight stage of a current air route data point, and computing a flight progress in the flight stage; and computing a flight distance under the flight progress according to a pre-calibrated flight stage position to obtain the estimated position.

For each secondary checking party, the estimated position is computed based on a uniform motion state.

Further, identifying a trajectory deviation includes:
judging whether it is beyond a range-along-line; connecting two points of a last planned waypoint and a next planned waypoint of a current position of each unmanned air vehicle; computing a deviation distance between the current position and a connected line; and judging it is a situation beyond the range-along-line according to the deviation distance.

Predicting whether the next waypoint can be arrived, predicting whether a position of the next waypoint can be arrived, and further predicting a time for arriving a corresponding position is specifically as follows:
acquiring real-time flight data $x_a=[x_{lat\_a}, y_{lon\_a}, z_{alt\_a}, t_a, v_a, \varphi_{v\_a}, \theta_{v\_a}]$, wherein $x_{lat}$, $y_{lon}$, $z_{alt}$ are a longitudinal, a transverse, and a vertical distance coordinates obtained by converting longitude and latitude information relative to a preset origin; and $t_a$ is a current time, and $v_a$ is a current flight velocity. Drawing a velocity ray with current $[x_{lat}, y_{lon}, z_{alt}]$ as a starting point and $[\varphi_{v\_a}, \theta_{v\_a}]$ as a heading and a pitching direction; and a point is taken from the ray with dt*v as a unit distance. As dt gradually increases from zero, when the point is within a range of $[-dl_1, dl_2]$ of the next planned waypoint, judging whether $dt+t_a$ is within a time interval $[-(t-t_1),(t_2-t)]$ of the next waypoint. If $dt+t_a$ is within the time interval, performing no action. If $dt+t_a$ is not within the time interval, marking as an "out-of-safety time capsule". If, as dt gradually increases from zero, the point taken is not within the $[-dl_1, dl_2]$ distance interval of the next planned waypoint, marking as an "out-of-safety space capsule".

Further, optimizing a path adopts an objective function as follows:

$$J = W_0 DIST(a_t, b_{z_0}) + \sum_{i=0}^{N_z} W_{i+1} DIST(b_{z_i}, b_{z_{i+1}}) + W_Y Y$$

wherein $a_t$ is the current waypoint; $b_{z_0}$ is a next standby waypoint; $W_i$ is a path weight for emphasizing a setting of an important path; $N_z$ represents a maximum number of waypoints for a standby waypoint route; $W_y$ is a conflict quantity coefficient used for optimizing and removing the conflict situation; and Y is a conflict checking result, and an optimization objective is as follows: a $Z_i$ sequence is optimized to minimize J.

Further, the steps further include an emergency stage: during a real-time flight, acquiring an obstacle distance is for judgment of danger; and when the obstacle distance is within a dangerous distance, performing emergency obstacle avoidance, and publishing an emergency obstacle avoidance measure.

A system for resolving a multi-operator distributed collaborative conflict of an unmanned air vehicle, used for implementing the above conflict resolution method, includes: a public PSP and a plurality of service SSPs. Each service SSP includes a strategy checking module, a pre-tactic checking module and a tactic checking module. The strategy checking module is used for acquiring an airspace requirement and performing rasterization, receiving preset airspace rasterization data in the public PSP, performing preliminary conflict resolution, and generating strategy approval information; the strategy approval module is used for a check according to the strategy approval information; the pre-tactic checking module is used for acquiring flight plan information and initiating an approval request, and is used for designating checking parties according to the approval request for multiple checks, performing judgment in combination with checking results of a plurality of checking parties, and generating a conflict checking result; the tactic checking module is used for identifying a trajectory deviation according to real-time flight data, sending out a warning according to a deviation category, and optimizing a path according to the deviated trajectory; and a tactic approval module is used for receiving a flight plan after path optimization and performing a check.

Further, each service SSP further includes an emergency decision module and a publishing module. The emergency decision module is used for identifying a dangerous distance and performing emergency obstacle avoidance; and the publishing module is used for publishing an adopted obstacle avoidance measure.

Further, the strategy checking module includes an airspace rasterization module and a rasterization comparison module. The airspace rasterization module rasterizes a time range and a space range according to rasterization elements, and compares grids one by one through the rasterization comparison module in preliminary conflict resolution to obtain a conflict situation between the airspace requirement and the preset airspace, adjusts the airspace requirement according to the conflict situation, automatically coordinates a flight plan to achieve a situation without a grid conflict, and generates the strategy approval information; and the strategy approval module also checks the result provided by the strategy checking module in each service SSP by using a grid-by-grid comparison method to determine whether an approval is achieved. If the service SSPs perform automatic coordination fruitlessly, the public PSP intervenes in allocation of flight plans, and a conflict-free flight plan in a strategic stage is finally obtained.

Further, each service SSP includes a distributed checking module, which is used as one of a plurality of designated checking parties to implement the multiple checks.

Further, each service SSP further includes a visualization module for visually displaying a conflict checking result, and assisting a man to resolve a conflict in a pre-tactical stage.

Further, the tactic checking module includes a deviation identification module and a dynamic flight conflict resolution module. The deviation recognition module is used for judging an air route deviation situation according to a current position and predicting an air route abnormal situation; and the dynamic flight conflict resolution module optimizes the path according to the deviation situation and the air route abnormal situation, and uploads optimized flight plan information to the tactic approval module.

From the above technical solution, it is known that compared with the prior art, the present invention provides the method and the system for resolving the multi-operator distributed collaborative conflict of the unmanned air vehicle, which adopt the distributed architecture to achieve conflict resolution in multiple stages such as the strategic stage, the pre-tactical stage, and the tactical stage, thereby reducing collision accidents under a multi-unmanned-air-vehicle operation while improving data security; and a checking loophole caused under the time interval is made up by a checking mode of a distributed check and global judgment, thereby further reducing the collision risk.

DESCRIPTION OF DRAWINGS

In order to more clearly illustrate the technical solutions in the embodiments of the present invention or in the prior art, the accompanying drawings that are required to be used in the description of the embodiments or the prior art will be briefly described below. Apparently, the accompanying drawings in the following description are only embodiments of the present invention, and other drawings can also be obtained according to the provided drawings without creative effort for that of ordinary skill in the art.

DETAILED DESCRIPTION

The following description of the embodiments of the present invention will be made clearly and completely with reference to the accompanying drawings in the embodiments of the present invention. Apparently, the embodiments described are only some of the embodiments of the present invention, but not all of the embodiments. All other embodiments, which can be made by that of ordinary skill in the art based on the embodiments of the present invention without making any creative efforts, all fall within the scope of protection of the present invention.

Embodiment 1

Figure 1:
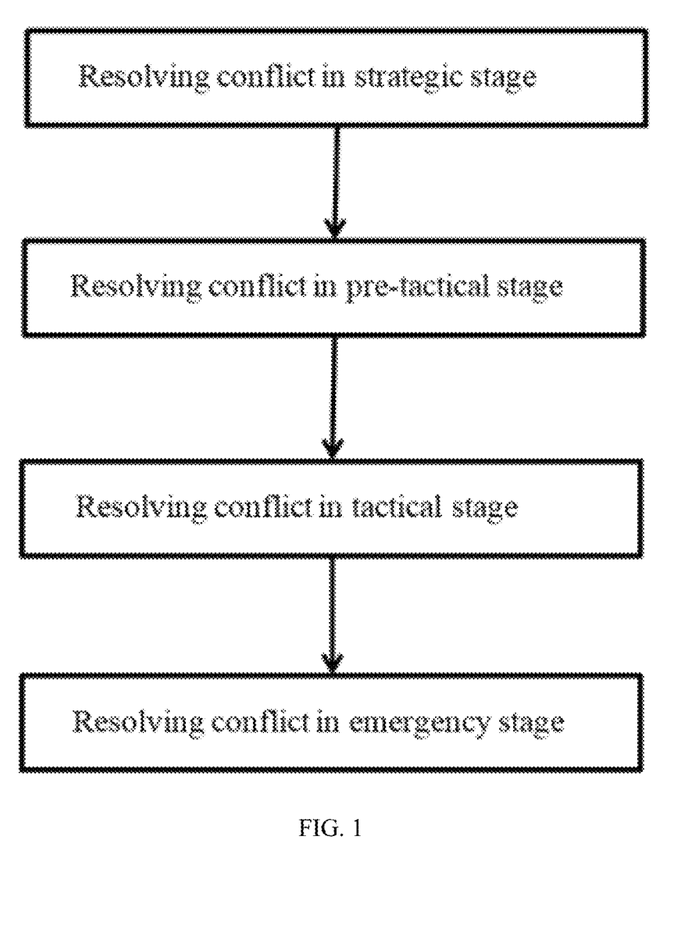
FIG. 1 is a schematic diagram of a method for resolving a multi-operator distributed collaborative conflict of an unmanned air vehicle.

As shown in FIG. 1, the embodiment of the present invention provides a method for resolving a multi-operator distributed collaborative conflict of an unmanned air vehicle, which is implemented based on a distributed architecture, wherein the distributed architecture is divided into two layers which are deployed respectively based on a public smart air mobility (SAM) service provider (denoted as public PSP) and a plurality of enterprise SAM service providers (SSPs) (denoted as service SSPs). The public PSP has functions of gathering and collecting flight information and decision information of the service SSPs, approving flight plans, providing global flight information retrieval, performing global conflict resolution decision and the like; and the service SSPs have functions of checking whether there is a conflict between the flight plans according to the global flight information, reporting checking results to the public PSP, submitting flight plan approvals of operators to the public PSP, sending instructions for executing the flight plans to an unmanned aerial vehicle device, performing conflict resolution and plan rearrangement of the local end flight plans and the like. The method includes the following steps:

S1: resolving a conflict in a strategic stage: generating multidimensional data based on time and spatial elements, rasterizing the multidimensional data, performing preliminary conflict resolution according to a preset airspace and an airspace requirement after rasterizing, and generating strategy approval information; and completing strategy conflict resolution by checking the strategy information;

S2: resolving a conflict in a pre-tactical stage: acquiring flight plan approval information, designating checking parties, performing multiple checks on the flight plan information, and performing judgment in combination with checking results of a plurality of checking parties to generate a conflict checking result;

S3: resolving a conflict in a tactical stage: identifying a trajectory deviation according to real-time flight data, and sending out a warning according to a deviation category; and optimizing a path according to the deviated trajectory, so as to complete tactical conflict resolution.

In order to further implement the above technical solution, in S1, multidimensional data includes a time, a longitude, a latitude, and an altitude. Preliminary conflict resolution includes: setting a rasterization element; rasterizing a time range and a space range according to the rasterization element; comparing grids one by one to obtain a conflict situation between the airspace requirement and the preset airspace; and adjusting the airspace requirement according to the conflict situation to generate strategy approval information.

Specifically, the public PSP provides information such as an airspace restriction, an electronic fence, an airspace route, a flight plan, a flight task, an operation situation, a population density, and a geographical environment of an operator party to each service SSP; and each service SSP performs grid-by-grid comparison on the flight plan according to a grid structure and coordinates the flight plan automatically to achieve the situation of no grid conflict. Each service SSP obtains a conflict-free flight plan, submits it to the public PSP for checking, and the public PSP also uses a grid-by-grid comparison method to check the result provided by the service SSP, and determines whether to approve. If the service SSPs perform automatic coordination fruitlessly, the public PSP intervenes in allocation of flight plans, and a conflict-free flight plan in a strategic stage is finally obtained.

In this embodiment, data of the airspace requirement is described in the following form:

$$x_m = [s_m, t_m, a_m]$$

$s_m$ describes a space range:

$$s_m = [[[lat_1, lon_1], [lat_2, lon_2], \ldots [lat_N, lon_N]], [alt_{low}, alt_{up}]]$$

wherein $[[lat_1, lon_1], [lat_2, lon_2], \ldots [lat_N, lon_N]]$ represent polygonal spaces on a map surrounded by N longitude and latitude points; and lat and lon represent the latitude and the longitude respectively. $[alt_{low}, alt_{up}]$ represents a range of the altitude, which is equivalent to that a polygonal column is pulled up from an altitude $alt_{low}$ to an altitude $alt_{up}$ with a polygon as a bottom, and an airspace range of a spatial three-dimensional space is integrally formed.

$t_m$ represents a time range: $t_m = [t_{begin}, t_{end}]$, which represents a range from a time $t_{begin}$ to a time $t_{end}$, being a time range of a planned flight applied for the strategic stage.

$a_m$ is supplementary information, being a library of primary waypoints that the unmanned aerial vehicle may fly by within the time and space ranges described by $s_m$ and $t_m$. For $a_m = [a_{m0}, a_{m1}, \ldots a_{mN}]$, $a_{mi}$ is one piece of waypoint information. An order of i from 1 to N does not represent an actual flight order.

For the above data rasterization: according to the description, $[s_m, t_m]$ forms the airspace range including a space and a time. With the rasterization element $dm = [d_{lat}, d_{lon}, d_t]$ as a basic cell, $[s_m, t_m]$ is rasterized, and stored in a system, which is called rasterization of flight information in this stage. Latitude and longitude intervals represented by $d_{lat}$, $d_{lon}$ being 1 m and a time interval with $d_t$ being 1 s may be set for convenient computation.

In order to further implement the above technical solution, in S2, the checking parties include a main checking party and a plurality of secondary checking parties, wherein the main checking party is an initiator platform of the flight plan approval information, and each secondary checking party is a node platform preset in a distributed architecture.

Specifically, a certain service SSP uploads a flight plan approval at a certain moment; and when receiving the application, the public PSP provides a search interface of public information such as all approved flight plans after a current time of a planned flight day is provided to the service SSP, and selectively copies a checking task to other service SSPs with checking qualifications, so that multiple checks may be performed.

For a service SSP platform for uploading the flight plan approvals, namely the main checking party, data for flight plan checking, obtained by the service SSP platform, is expressed as $[x_p', \widetilde{x_{p\_mkq\_t_c}}]$. The service SSP knows more detailed and accurate information than other service SSPs for the unmanned air vehicle operating by itself, and is also free from an error caused by time delay. For other service SSP platforms which accept multiple flight plan approval activation checking tasks provided by the public PSP, namely the secondary checking parties, obtained data for flight plan checks is expressed as $[\widetilde{x_p^T}, \widetilde{x_{p\_mkq\_t_c}}]$.

The multiple checks have the following steps:

S21: with waypoints in a unit time in the flight plan information as checking units, computing checking factors y of the checking units:

$$[y,c]=z(a_1,a_2)$$

$$z(a_1, a_2) = \begin{cases} \text{if } DIST(a_1, a_2) < l_c, y = 1, c = a_1 \\ \text{if } DIST(a_1, a_2) \neq 0, y = 0, c = \text{null} \end{cases}$$

$$a_1=[x_1,y_1,z_1]$$

$$a_2=[x_2,y_2,z_2]$$

wherein Z is a checking function; DIST is a distance function; $a_1$ and $a_2$ are position vectors, wherein x, y and z respectively represent forward, transverse and vertical position elements; y is the checking factor, used for judging a level of a conflict; c is a conflict marking bit containing a time stamp of a current day; and $l_c$ is a specific position of the conflict in the flight plan to be checked.

S22: obtaining a conflict vector index as a conflict checking result Y according to the checking factors y of various checking units.

$$Y = \sum_0^{t_c=86400/dt_c} \sum_1^{q=N_q} \sum_1^{k=N_k} \sum_1^{m=N_m}$$
$$\left(z_y(x_{p\_t_c}', \widetilde{x_{p\_mkq\_t_c}}) + z_y\left(x_{p\_t_c}' + \left[[-dl_1, dl_2], \pm\frac{w_l}{2}, \pm\frac{w_h}{2}\right],\right.\right.$$
$$\widetilde{x_{p\_mkq\_t_c}} + \left[[-dl_1, dl_2], \pm\frac{w_l}{2}, \pm\frac{w_h}{2}\right]\right) + z_y$$
$$\left.\left(x_{p\_t_c}' + \left[[-dl_1, dl_2], \pm\frac{w_l}{2}, \pm\frac{w_h}{2}\right], \widetilde{x_{p\_mkq\_t_c}} + \left[[-dl_1, dl_2], \pm\frac{w_l}{2}, \pm\frac{w_h}{2}\right]\right)\right)$$

wherein $z_y$ represents an y-value output of the function z; $d_{t_c}$ represents the unit time of each checking unit; $N_m$ represents a number of service SSPs, $N_k$ represents a number of sorties in flight plans submitted for different service SSPs, and $N_q$ represents a number of flight plans of different aircrafts whose flight plans are submitted for the different service SSPs; in the formula, $$\left[[-dl_1, dl_2], \pm\frac{w_l}{2}, \pm\frac{w_h}{2}\right]$$

is computed by superposition of forward, transverse, and vertical directions of an air route segment, fitting to a corresponding air route segment, and positive and negative signs represent several possibilities of positive or negative superposition computation; and subscript_$t_c$ of $x_{p\_t_c}'$ represents that different $t_c$ correspond to estimated positions $x_{p\_t_c}'$ of unmanned air vehicles in the flight plans with integration of $t_c$.

In this embodiment, for the main checking party, the estimated position is obtained by the following way:

acquiring a flight stage of a current air route data point, and computing a flight progress in the flight stage; and computing a flight distance under the flight progress according to a pre-calibrated flight stage position to obtain the estimated position. Specifically, the operator should master a more detailed dynamics model for the unmanned air vehicle operating in this unit, so as to perform finer conflict computation. Here, an estimation method is provided, which requires following supplementary information: for an average velocity variable of a series of air route segments, a subscript of an average velocity $v_l$ of a flight between the two waypoints is consistent with a subscript i of one waypoint in the air route segment, namely $v_{li}$; while a flight approaching the waypoint is set at uniform acceleration and deceleration, with basically same acceleration and deceleration values. Then, let $x_{p\_t_c}=[x_{t_c}, y_{t_c}, z_{t_c}]$, for one air route segment, let a time and a distance from passing through a last air route segment to entering a stable flight state be $t_1$ and $s_1$ respectively, a stable flight time and distance in an air route segment between two waypoints be $t_2$ and $s_2$ respectively, and a time and a distance from leaving the stable air route segment to arriving a next waypoint be $t_3$ and $s_3$ respectively, then $$t_3 = (DIST(x_{i+1}, x_i) - (t_{i+1} - t_i)v_{li})\frac{2|v_{i+1} - v_{li}|}{(v_i - v_{li})|v_{li} - v_i| + (v_{i+1} - v_{li})|v_{i+1} - v_{li}|}$$

$$t_1 = \frac{|v_{li} - v_i|}{|v_{i+1} - v_{li}|}t_3$$

$$t_2=t_{i+1}-t_i-t_3-t_1$$

$$s_1 = t_1\frac{(v_i + v_{li})}{2}$$

$$s_2=t_2 v_{li}$$

$$s_3 = t_3 \frac{(v_{li} + v_{i+1})}{2}$$

Here, $t_1$, $t_2$, $t_3$ are all equal to or greater than zero. First, it is judged whether $t_c$ belongs to the stage $t_1$, $t_2$, or $t_3$ in $t_i$–$t_{i+1}$; and then according to a proportion of times occupied by $t_c$ in the three stages, $x_{t_c}$, $y_{t_c}$, $z_{t_c}$ are computed according to a relationship between each of $s_1$, $s_2$, and $s_3$ and DIST $(x_{i+1}, x_i)$.

For the secondary checking parties, the estimated position is computed based on the uniform motion state. Let $x_{p\_t_c}' = [x_{t_c}, y_{t_c}, z_{t_c}]$, then $$x_{t_c} = \frac{x_{i+1} - x_i}{t_{i+1} - t_i}(t_c - t_i), \; y_{t_c} = \frac{y_{i+1} - y_i}{t_{i+1} - t_i}(t_c - t_i), \text{ and } \frac{z_{i+1} - z_i}{t_{i+1} - t_i}(t_c - t_i),$$

and then a solution is performed to obtain $x_{t_c}$, $y_{t_c}$, $z_{t_c}$.

In this embodiment, for one checking result, if the Y value is not equal to 0, the result is denoted as there is a conflict; and if the Y value is equal to 0, the result is denoted as there is no conflict. The checking results of the plurality of service SSPs are possibly different due to the facts that data sources are slightly different caused by the likelihood of slightly different checking algorithms of various service SSPs and a difference between objective data transmission periods and the like. If the checking results with the conflict are different, namely, that is some service SSPs judge conflict freedom, and some service SSPs judge existence of the conflict, the public PSP may selectively issue the flight plans reported for approvals again in a next second, then perform a distributed flight plan check, and collect distributed checking results, so that a difference between the results caused by the data source difference may be eliminated. A maximum number of times of reissue may be set as three times. After the three times of issue, if the checking results are converged to be uniformity, and if the uniformity is the conflict, the flight plan is refused; and if the uniformity is no conflict, the flight plan is approved. If the results are not unified in the distributed checking process for the maximum number of times of issue, the main service SSP which provides the flight plan approval is concerned; if the main service SSP judges as the conflict, the flight plan is refused; and if the main service SSP judges as no conflict, the flight plan is approved, and the main service SSP is responsible for the checking result. If the secondary service SSP is different from the main service SSP in checking result, the public PSP provides alarm information to the main service SSP, and the main service SSP may determine whether repeated checks are needed by itself.

If the public PSP approves the flight plan, information about the approved flight plan is stored in a database, and the service SSP is informed of the approval result. If the public PSP refuses the flight plan, the Y values in the checking results are summarized to compute an average value to obtain $\overline{Y}$, and a refusion result and data about $\overline{Y}$ and a c sequence are provided to the main service SSP for reference, so that the main service SSP can automatically resolve and rearrange the conflicting flight plans aiming to a conflict position, and re-submit the flight plant for an approval. At the same time, the public PSP may provide a visual service. In a three-dimensional scene, c mark position is colored in a form of a dot. If computed $\overline{Y}$ is larger, the color will be reddish; and if $\overline{Y}$ is smaller, the color is bluish. In this way, the c mark position may be intuitively provided to the main service SSP for viewing, so that the main service SSP can know a specific time and position when and where the flight plans have the conflict, thereby facilitating rearrangement of the flight plans.

In order to further implement the above technical solution, in S3, identifying a trajectory deviation includes:

In a first aspect, judging whether it is beyond a range-along-line; connecting two points of a last planned waypoint and a next planned waypoint of a current position of each unmanned air vehicle; computing a deviation distance between the current position and a connected line; and judging it is a situation beyond the range-along-line according to the deviation distance. For example, if the deviation distance between the current position and the connected line is greater than $range_1$, as can be referenced to a setting $range_1 = \min(10, w_1, w_h)$, then an "out-of-air route operation space" is marked. If the distance between the current position and the connected line is greater than $range_2$, as can be referenced to a setting $range_2 = \max(20, w_1, w_h)$, then an "out-of-airspace buffer space" is marked.

In a second aspect, predicting whether the next waypoint can be arrived, and predicting whether a position of the next waypoint can be arrived, and further predicting a time for arriving a corresponding position is specifically as follows:

acquiring real-time flight data $x_a = [x_{lat\_a}, y_{lon\_a}, z_{alt\_a}, t_a, v_a, \varphi_{v\_a}, \theta_{v\_a}]$, wherein $x_{lat}, y_{lon}, z_{alt}$ are a longitudinal, a transverse, and a vertical distance coordinates obtained by converting longitude and latitude information relative to a preset origin;

Drawing a velocity ray with current $[x_{lat}, y_{lon}, z_{alt}]$ as a starting point and $[\varphi_{v\_a}, \theta_{v\_a}]$ as a heading and a pitching direction; and a point is taken from the ray with dt*v as a unit distance. As dt gradually increases from zero, when the point is within a range of $[-dl_1, dl_2]$ of the next planned waypoint, judging whether $dt + t_a$ is within a time interval $[-(t-t_1), (t_2-t)]$ of the next waypoint. If $dt + t_a$ is within the time interval, performing no action. If $dt + t_a$ is not within the time interval, marking as an out-of-safety time capsule. If, as dt gradually increases from zero, the point taken is not within the $[-dl_1, dl_2]$ distance interval of the next planned waypoint, marking as an out-of-safety space capsule.

In order to further implement the above technical solution, after receiving anomaly information, the public PSP has the following treatment method:

If a certain unmanned air vehicle is marked as "out-of-air-route operation space", "out-of-airspace buffer space", "out-of-safety time capsule" or "out-of-safety space capsule" by the main service SSP, the current flight plan is in a warning state, with a warning mark being a "flight path deviation" warning, so that a flight task change approval flow can start immediately. The flight task change approval refers to an approval flow starting at any time during flight in a format of a flight plan report, which requires to consider a current position and time of the aircraft, and a future waypoint sequence available by reasonable arrangement. The waypoint sequence for a flight task change s may be extracted from a complementary standby waypoint sequence within original flight plan information.

If a certain aircraft is not marked as any alarm indication for plan execution, but there is a secondary service SSP pre-warning a likelihood of a conflict for the unmanned air vehicle in a future planned flight path as other unmanned air vehicles that do not fly as planned to cause a warning of the "out-of-air-route operation space", the "out-of-airspace buffer space", the "out-of-safety time capsule" or the "out-of-safety space capsule", then the main service SSP can mark the unmanned air vehicle as a warning of "future flight path risk", and the flight task change approval flow may also start for the unmanned air vehicle, so as to reduce the flight path risk.

A service SSP operator starting a dynamic flight plan approval may achieve real-time flight conflict resolution through a flight task trajectory planning method. The method specifically includes the following steps:

S31: determining an optimization index.

If it is determined to start the flight task change approval flow, first, standby waypoint information $x_b=[b_0, b_1, \ldots b_N]$ is extracted from the original flight plan; let a current waypoint be $a_t$, a reasonable waypoint sequence $[a_t, b_{z_0}, b_{z_1}, \ldots, b_{z_N}]$, $z_i \in [0,N]$, $b_{z_i} \in x_b$ is selected; and a path value function J is computed:

$$J = W_0 DIST(a_t, b_{z_0}) + \sum_{i=0}^{N_z} W_{i+1} DIST(b_{z_i}, b_{z_{i+1}}) + W_Y Y$$

wherein $W_i$ is a path weight for emphasizing a setting of an important path, wherein $W_0$ is a first value of the path weight, matching with an air route segment between the current $a_t$ and a first standby waypoint $b_{z_0}$; and the rest $W_i$ is matched with an air route segment between $b_{z_{i-1}}$ and $b_{z_i}$. $N_z$ is an integer, which represents a maximum number of waypoints in a standby waypoint route; and Y is a conflict quantity index computed in S22, and $W_Y$ is a conflict quantity coefficient, used for optimizing and removing the conflict situation. Then an optimization objective is set as: a $z_i$ sequence is optimized to minimize J.

S32: Optimizing a path. Optimizing a flight trajectory by adopting an artificial bee colony method, including the following steps:

S321: Initializing a population solution.

Setting a population scale of an NS group, randomly generating an NS group initial population solution $x_s=[x_{s_1}, x_{s_2}, \ldots x_{s_{NS}}]$ (NS=50 may be set), each solution contains following information $x_{s_i}=[z_0, z_1, \ldots z_N]$, denoted as an initial honey source of forager bees; computing a value function sequence $J_s$ of an initial forager bee population solution;

$$J_s=[J_{s_1}, J_{s_2}, \ldots J_{s_{NS}}]$$

setting a fitness function fit, wherein the smaller the characterization J is, the larger a fit value is $$\text{fit}_i = \begin{cases} \dfrac{1}{1+J_{s_i}}, & J_{s_i} \geq 0 \\ 1 + \text{abs}(J_{s_i}), & \text{otherwise} \end{cases}$$

S322: Performing director bee computation.

Setting director bees to search a new honey source $v_{s_i}$ according to the following formula:

$$v_{s_i} = x_{si} + \phi(x_{s_i} - x_{s_j})$$

wherein $\phi$ is a random number within $[-1,1]$; $i, j \in \{1, 2, \ldots NS\}$, and $i \neq j$; and when the fitness function of the new honey source is better than that of the old honey source, let the new honey source replace the old honey source according to a greedy principle.

S323: Performing onlooker bee computation.

Computing a following probability $$P_i = \text{fit}_i / \sum_{i=1}^{NP} \text{fit}_i;$$

Setting onlooker bees to select the director bees by adopting a roulette wheel mode, namely, generating a uniformly distributed random number in [0,1]; if $P_i$ is larger than the random number, making the onlooker bees generates a new honey source around the honey source I according to the formula $v_{s_i}$; and judging whether to reserve the honey source by using a same computation principle as the director bees.

S324: Performing scout bee computation.

From the previous step, judging whether the honey source i satisfies a discarded condition; if so, changing corresponding director bee roles to scout bees, and searching for a new solution in a specified solution domain; or otherwise, directly turning to step 5.

S325: performing cyclic iteration.

Judging whether a number of cycles is larger than a maximum value (such as may be set as 500); if so, stopping population optimization iteration; or if a change satisfying J is smaller than 1e-8, if so, stopping population optimization iteration; and if the situation is not satisfied, continuing to optimize the population according to the above steps.

S326: acquiring an optimized path result.

Obtaining a solution $[z_0, z_1, \ldots z_N]$ enabling J to be relatively small according to an artificial bee colony path optimization algorithm, and obtaining an optimized waypoint sequence $[a_t, b_{z_0}, b_{z_1}, \ldots, b_{z_N}]$; and if the Y value of the optimized result is judged as zero, submitting a flight task change approval.

The flight task change approval flow is consistent with the conflict resolution step in S2. Once the public PSP issues an approval instruction, the unmanned air vehicle flies according to a new flight plan task. If the public PSP does not issue the approval instruction, the unmanned air vehicle operates according to the original flight plan until an emergency conflict resolution situation is triggered, and then the situation is treated according to a method for an emergency situation.

In order to further implement the above technical solution, the method further includes step S4: in an emergency stage: acquiring an obstacle distance is for judgment of danger; and when the obstacle distance is within a dangerous distance, performing emergency obstacle avoidance, and publishing an emergency obstacle avoidance measure Specifically, an emergency conflict situation may be defined as a conflict resolution behavior made when a distance between two aircrafts are smaller than a dangerous range $L_a$. The dangerous range needs to consider parameters such as a velocity and a size of a aircraft, which may be set different for different service SSPs. It may be primarily estimated that a first warning range $L_{a1}$ is 20 m, and a second warning range $L_{a2}$ is 10 m.

If the main service SSP marks a certain unmanned air vehicle as a warning of "flight path deviation" or "risk in future flight path", and the unmanned air vehicle encounters another unmanned air vehicle to enter the range $L_a$, the unmanned air vehicle may make avoidance in an up-down dislocation mode and a left-right turn dislocation mode.

The up-down dislocation mode may refer to that: the unmanned air vehicle receiving a warning of "flight path abnormality" is immediately lifted up by 5 m, the unmanned air vehicle receiving a warning of "risk in future flight path" is immediately lowered by 5 m, and the like.

The left-right turn dislocation mode is basically based on the fact that both sides adopt rightward dislocation in principle; but if the opposite side does not act according to a rightward avoidance method, description in the following method is seen.

If there are no less than 2 aircrafts within a dangerous distance circle, the unmanned air vehicle taking an emergency measure may broadcast an emergency obstacle avoidance strategy adopted, such as sizes of distance parameters that are "pulled up", "lowered", "hovered", and "to the right", and entering an emergency waiting space", and reports the adopted emergency obstacle avoidance strategy to the public PSP.

If the distance between the two unmanned air vehicles is within the range $L_{a2}$, a type of the emergency measure may be published first, the emergency obstacle avoidance measure may be executed immediately after publishment, or the emergency obstacle avoidance measure may be executed after the distance is within the range $L_{a1}$; and the service SSP selects the emergency obstacle avoidance measure by its own.

If an air vehicle A appears within the dangerous distance circle of a certain unmanned air vehicle M, and is not within a control range of the public and service SSP architecture or does not act complying with the emergency rightward avoidance method, the unmanned air vehicle M may rely on its own obstacle avoidance algorithm to dynamically avoid an obstacle, and reports the whole special emergency situation to the public PSP afterwards. A dynamic obstacle avoidance method may refer to the following method in a left-right dislocation direction:

Let a velocity of the unmanned air vehicle M be $v_M$, and a velocity of the aircraft A be $v_A$, a relative velocity of M to A is $v_{MA}$. A circle is made with A as an origin and $L_{a1}$ as a radius, and two tangent lines of the circle $L_{a1}$ are made with M as an origin. When a velocity direction of $v_{MA}$ is within a fan angle range formed by the two tangent lines, there are now two options: one is to turn to the left, and the other is to turn to the right. If the direction of $v_{MA}$ is in a left plane of an MA connected line, left-turning obstacle avoidance is selected; and if the direction of $v_{MA}$ is in the right plane of the MA connected line, right-turning obstacle avoidance is selected. The method may make an obstacle avoidance response immediately after the unmanned air vehicle enters $L_{a2}$; if the unmanned air vehicle has entered the circle $L_{a1}$, a circle is drawn with $L_{a1}/2$ as a radius, and a tangent line of a circle $L_{a1}/2$ is made with M as an origin; and the subsequent method is the same as that described above. The left-right dislocation and up-down dislocation modes may be adopted in a superposing manner, for example, a right turn may be selected through the left-right dislocation mode, and pullup may be made at the same time, namely, right turn and pullup are both made, so that a collision risk degree is reduced better.

After the emergency obstacle avoidance strategy is completed, the unmanned air vehicle no longer executes the original flight plan. If it is expected to re-enter the air route to fly, there is a need for performing a flight plan update approval as soon as possible, and the update flight plan is executed after the approval is obtained.

Embodiment 2

Figure 2:
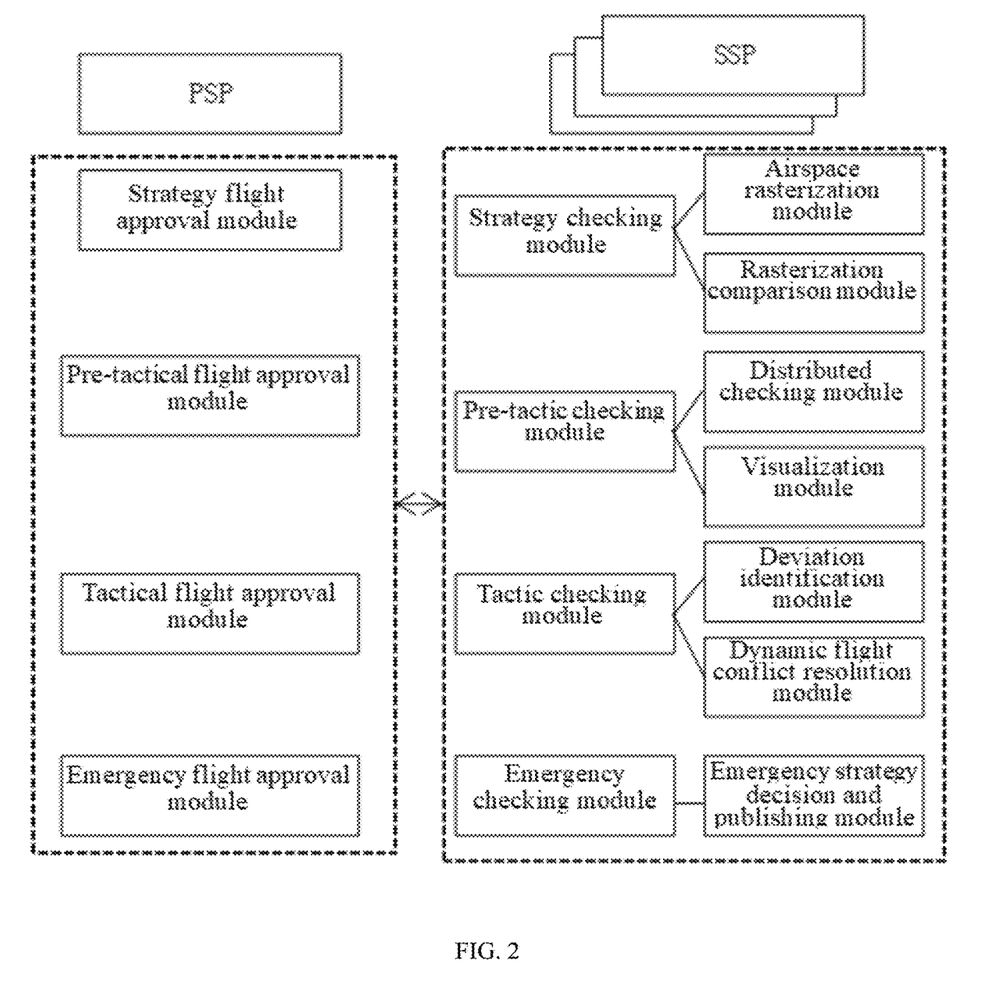
FIG. 2 is a structural schematic diagram of a system for resolving a multi-operator distributed collaborative conflict of an unmanned air vehicle.

As shown in FIG. 2, the embodiment of the present invention discloses a system for resolving a multi-operator distributed collaborative conflict of an unmanned air vehicle, through which the conflict resolution method in embodiment 1 may be implemented, including: a public PSP and a plurality of service SSPs. Each service SSP includes a tactic checking module, a pre-tactic checking module, and a tactic checking module. The public PSP includes a tactic approval module, a pre-tactic approval module and a tactic approval module.

The strategy checking module is used for an airspace requirement and performing rasterization, receiving preset airspace rasterization data in the public PSP, performing preliminary conflict resolution, and generating strategy approval information.

In one embodiment, the strategy checking module includes an airspace rasterization module and a rasterization comparison module. The airspace rasterization module rasterizes a time range and a space range according to rasterization elements, and compares grids one by one through the rasterization comparison module in preliminary conflict resolution to obtain a conflict situation between the airspace requirement and the preset airspace, adjusts the airspace requirement according to the conflict situation, automatically coordinates a flight plan to achieve a situation without a grid conflict, and generates the strategy approval information.

The strategy approval module is used for a check according to the strategy approval information. In this embodiment, the strategy approval module also checks the result provided by the strategy checking module in the service SSP by using a grid-by-grid comparison method to determine whether an approval is achieved. If the service SSPs perform automatic coordination fruitlessly, the public PSP intervenes in allocation of flight plans, and a conflict-free flight plan in a strategic stage is finally obtained.

The pre-tactic checking module is used for acquiring flight plan information and initiating an approval request, wherein the flight plan information $x_p$ consists of a series of waypoints:

$$x_p = [a_0, a_1, \ldots a_N]$$

wherein $a_i$ is one piece of waypoint information, and is needed to include at least the following elements: planned waypoint position information: lat, lon, and alt are a latitude, a longitude, and an altitude respectively; time information for planning to arrive a waypoint: t; and planned waypoint arrival velocity information: V.

In addition, the waypoint information further includes supplementary information, which is needed to contain one of the following categories of information:
1. a time interval form $t_1$ to $t_2$ for planning to arrive the waypoint, i.e., the time for arriving the waypoint may vary from $t_1$ to $t_2$, with t being between $t_1$ and $t_2$;
2. a distance interval from $dl_1$ to $dl_2$, planning to arrive the waypoint, i.e., at a time t, the unmanned air vehicle may be located a distance $dl_1$ before the planned waypoint, or a distance $dl_2$ after the planned waypoint.

Besides this, each piece of flight plan information may be supplemented with settings of a safe section dimension and a standby waypoint sequence, which are stored by the service SSPs themselves:

The safe section dimension: the supplementary information, which, whether being the time interval or the distance interval, describes a safe region following a direction of the waypoint sequence; while the safe section dimension herein describes lateral and vertical safe dimensions following the waypoint sequence, wherein the lateral safe dimension is set as $w_l$, and the vertical safe dimension is set as $w_h$. Then for a waypoint, the safe space region is described by $$\left[\left[-\frac{w_h}{2}, \frac{w_h}{2}\right], \left[-\frac{w_l}{2}, \frac{w_l}{2}\right], [-dl_1, dl_2]\right],$$

$$\text{or}\left[\left[-\frac{w_h}{2}, \frac{w_h}{2}\right], \left[-\frac{w_l}{2}, \frac{w_l}{2}\right], [-(t-t_1)v, (t_2-t)v]\right].$$

The standby waypoint sequence contains a waypoint which may be adopted emergently when a preset flight plan cannot be used in consideration of a flight conflict situation, including contents such as a landing waypoint and an emergency region waypoint, and defined as $x_b = [b_0, b_1, \ldots b_N]$, wherein $b_i$ is a standby waypoint.

Flight plan data containing time and position information is a reference form of intended four-dimensional flight path i4DT or four-dimensional flight path 4DT information, and is set for convenience in conflict resolution computation.

In one embodiment, each service SSP includes a distributed checking module, and the distributed checking modules corresponding to the plurality of service SSPs collectively implement multiple checks, and upload the checking structures to a public PSP.

In another embodiment, each service SSP further includes a visualization module, used for visually displaying a conflict checking result, and assisting a man to resolve a conflict in a pre-tactical stage.

The tactic checking module is used for identifying a trajectory deviation according to real-time flight data, sending out a warning according to a deviation category, and optimizing a path according to the deviated trajectory. The tactic approval module is used for receiving a flight plan after path optimization and performing a check.

In one embodiment, the tactic checking module includes a deviation identification module and a dynamic flight conflict resolution module. The deviation identification module is used for judging an air route deviation situation according to a current position and predicting an air route abnormal situation; and the dynamic flight conflict resolution module optimizes the path according to the deviation situation and the air route abnormal situation, and uploads optimized flight plan information to the tactic approval module.

In order to further implement the technical solution, the public PSP further includes an emergency flight approval module, and each service SSP further includes an emergency checking module. Specifically, and the emergency checking module includes an emergency strategy decision module and a publishing module. When an obstacle distance is detected to be within the dangerous distance, the emergency strategy decision module avoids an obstacle according to a predicted obstacle avoidance rule, and publishes an executed obstacle avoidance strategy through the publishing module.

In the specification, various embodiments are described in a progressive manner, and each embodiment is mainly described in a different point from other embodiments, and identical and similar parts between the embodiments can be seen from each other. For the device disclosed in each embodiment, since it corresponds to the method disclosed in the embodiment, the description is relatively simple, and the relevant points refer to the description of the method section.

The above description of the disclosed embodiments is provided to enable those skilled in the art to implement or use the present invention. Various modifications to these embodiments will be readily apparent to those skilled in the art, and the generic principles defined herein may be implemented in other embodiments without departing from the spirit or scope of the present invention. Thus, the present invention is not intended to be limited to these embodiments shown herein, but should conform to the widest scope consistent with the principles and novel features disclosed herein.

What is claimed is:

1. A method for resolving a multi-operator distributed collaborative conflict of an unmanned air vehicle, comprising:

resolving a conflict in a strategic stage: generating multidimensional data based on time and spatial elements, rasterizing the multidimensional data, performing preliminary conflict resolution according to a preset airspace and an airspace requirement after rasterizing, and generating strategy approval information; and completing strategy conflict resolution by checking the strategy information;

resolving a conflict in a pre-tactical stage: acquiring flight plan approval information, designating checking parties, performing multiple checks on the flight plan information, and performing judgment in combination with checking results of a plurality of checking parties to generate a conflict checking result, the step comprising:

with waypoints in a unit time in the flight plan approval information as checking units, computing checking factors y of the checking units:

$$[y, c] = z(a_1, a_2)$$

$$z(a_1, a_2) = \begin{cases} \text{if } DIST(a_1, a_2) < l_c, y = 1, c = a_1 \\ \text{if } DIST(a_1, a_2) \neq 0, y = 0, c = \text{null} \end{cases}$$

$$a_1 = [x_1, y_1, z_1]$$

$$a_2 = [x_2, y_2, z_2]$$

wherein z is a checking function; DIST is a distance function,; $a_1$ and $a_2$ are position vectors; elements in the position vectors represent forward, transverse and vertical position elements from left to right respectively; y is the checking factor, used for judging a level of a conflict; C is a conflict mark bit containing a time stamp of a current day; and $I_c$ is a specific conflict position in a flight plan to be checked;

obtaining a conflict checking result Y according to the checking factors y of the checking units:

$$Y = \sum_0^{t_c = 86400/dt_c} \sum_1^{q=N_q} \sum_1^{k=N_k} \sum_1^{m=N_m}$$

$$\left(z_y\left(x'_{p\_t_c}, \widetilde{x_{p\_mkq\_t_c}}\right) + z_y\left(x'_{p\_t_c} + \left[[-dl_1, dl_2], \pm\frac{w_l}{2}, \pm\frac{w_h}{2}\right],\right.\right.$$

$$\left.\widetilde{x_{p\_mkq\_t_c}} + \left[[-dl_1, dl_2], \pm\frac{w_l}{2}, \pm\frac{w_h}{2}\right]\right) + z_y$$

$$\left(x'_{p\_t_c} + \left[[-dl_1, dl_2], \pm\frac{w_l}{2}, \pm\frac{w_h}{2}\right], \widetilde{x_{p\_mkq\_t_c}} + \left[[-dl_1, dl_2], \pm\frac{w_l}{2}, \pm\frac{w_h}{2}\right]\right)\right)$$

wherein $z_y$ represents an y-value output of the function z; $dt_c$ represents the unit time of each checking unit; $N_m$ represents a number of service SSPs, $N_k$ represents a number of sorties in flight plans submitted for different service SSPs, and $N_q$ represents a number of the flight plans submitted for different aircrafts with the flight plans submitted by different service SSPs; $t_1$ and $t_2$ are time interval nodes for arriving the waypoints; $dl_1$ and $dl_2$ are distance interval nodes for arriving the waypoints, $w_l$ is a transverse safety dimension, $w_h$ is a vertical safety dimension, and subscript $\_t_c$ of $x_{p\_t_c}'$ represents that different $t_c$ correspond to estimated positions of unmanned air vehicles in the flight plans with integration of $t_c$; and $\widetilde{x_{p\_mkq}}\_t_c$ represents corresponding approved flight plan data of the estimated positions;

resolving a conflict in a tactical stage: identifying a trajectory deviation according to real-time flight data, and sending out a warning according to a deviation category; and optimizing a path according to the deviated trajectory, so as to complete tactical conflict resolution.

2. The method for resolving the multi-operator distributed collaborative conflict of the unmanned air vehicle according to claim 1, wherein the multidimensional data comprises a time, a longitude, a latitude, and an altitude; preliminary conflict resolution comprises: setting a rasterization element; rasterizing a time range and a space range according to the rasterization element; comparing grids one by one to obtain a conflict situation between the airspace requirement and the preset airspace; and adjusting the airspace requirement according to the conflict situation to generate strategy approval information.

3. The method for resolving the multi-operator distributed collaborative conflict of the unmanned air vehicle according to according to claim 1, wherein the checking parties comprise a main checking party and a plurality of secondary checking parties; the main checking party is an initiator platform of the flight plan approval information, and each secondary checking party is a node platform preset in a distributed architecture.

4. The method for resolving the multi-operator distributed collaborative conflict of the unmanned air vehicle according to according to claim 3, wherein for the main checking party, each estimated position is obtained in the following way:
  acquiring a flight stage of a current air route data point, and computing a flight progress in the flight stage; and computing a flight distance under the flight progress according to a pre-calibrated flight stage position to obtain the estimated position;
  for each secondary checking party, the estimated position is computed based on a uniform motion state.

5. The method for resolving the multi-operator distributed collaborative conflict of the unmanned air vehicle according to claim 1, wherein identifying a trajectory deviation comprises:
  connecting two points of a last planned waypoint and a next planned waypoint of a current position of each unmanned air vehicle; computing a deviation distance between the current position and a connected line; and judging it is a situation beyond the range-along-line according to the deviation distance;
  predicting whether a position of the next waypoint can be arrived and further predicting a time for arriving a corresponding position, specifically as follows:
  acquiring real-time flight data $x_a=[x_{lat\_a}, y_{lon\_a}, z_{alt\_a}, t_a, v_a, \varphi_{v\_a}, \theta_{v\_a}]$, wherein $x_{lat}$, $y_{lon}$, $z_{alt}$ are a longitudinal, a transverse, and a vertical distance coordinates obtained by converting longitude and latitude information relative to a preset origin; and $t_a$ is a current moment, and $v_a$ is a current flight velocity;
  drawing a velocity ray with current $[x_{lat}, y_{lon}, z_{alt}]$ as a starting point and $[\varphi_{v\_a}, \theta_{v\_a}]$ as a heading and a pitching direction; and a point is taken from the ray with $dt*v$ as a unit distance; as dt gradually increases from zero, when the point is within a range of $[-dl_1, dl_2]$ of the next planned waypoint, judging whether $dt+t_a$ is within a time interval $[-(t-t_1), (t_2-t)]$ of the next waypoint; if $dt+t_a$ is within the time interval, performing no action; if $dt+t_a$ is not within the time interval, marking as an out-of-safety time capsule; and if, as dt gradually increases from zero, the point taken is not within the $[-dl_1, dl_2]$ distance interval of the next planned waypoint, marking as an out-of-safety space capsule.

6. The method for resolving the multi-operator distributed collaborative conflict of the unmanned air vehicle according to claim 5, wherein optimizing a path adopts an objective function as follows:

$$J = W_0 DIST(a_t, b_{z_0}) + \sum_{i=0}^{N_z} W_{i+1} DIST(b_{z_i}, b_{z_{i+1}}) + W_Y Y$$

wherein J represents the objective function; $a_t$ is the current waypoint; $b_{z_0}$ is a next standby waypoint; $W_i$ is a path weight for emphasizing a setting of an important path, $W_0$ represents a first value of the path weight, and $N_z$ represents a maximum number of waypoints for a standby waypoint route; $W_Y$ is a conflict quantity coefficient used for optimizing and removing the conflict situation; and Y is a conflict checking result, and an optimization objective is as follows: a $z_i$ sequence is optimized to minimize J.

7. The method for resolving the multi-operator distributed collaborative conflict of the unmanned air vehicle according to claim 5, further comprising the step:
  an emergency stage: during a real-time flight, acquiring an obstacle distance is for judgment of danger; and when the obstacle distance is within a dangerous distance, performing emergency obstacle avoidance, and publishing an emergency obstacle avoidance measure.

8. A system for resolving a multi-operator distributed collaborative conflict of an unmanned air vehicle, used for implementing the conflict resolution method according to claim 1, comprising: a public PSP and a plurality of service SSPs, wherein
  the public PSP comprises a strategy approval module, a pre-tactic approval module and a strategy approval module; each service SSP comprises a strategy checking module, a pre-tactic checking module and a strategy checking module;
  the strategy checking module is used for acquiring an airspace requirement and performing rasterization, receiving preset airspace rasterization data in the public PSP, performing preliminary conflict resolution, and generating strategy approval information;
  the strategy approval module is used for a check according to the strategy approval information;
  the pre-tactic checking module is used for acquiring flight plan approval information and initiating an approval request;
  the pre-tactic approval module is used for designating checking parties according to the approval request for multiple checks, performing judgment in combination with checking results of a plurality of checking parties, and generating a conflict checking result;
  the tactic checking module is used for identifying a trajectory deviation according to real-time flight data, sending out a warning according to a deviation category, and optimizing a path according to the deviated trajectory;

the tactic approval module is used for receiving a flight plan after path optimization and performing a check.

9. The system for resolving the multi-operator distributed collaborative conflict of the unmanned air vehicle according to claim 8, wherein each service SSP further comprises an emergency decision module and a publishing module; the emergency decision module is used for identifying a dangerous distance and performing emergency obstacle avoidance; and the publishing module is used for publishing an adopted obstacle avoidance measure.

* * * * *